United States Patent
Jousse

(10) Patent No.: US 8,463,501 B2
(45) Date of Patent: Jun. 11, 2013

(54) DEVICE FOR CONTROLLING PASSENGER PROTECTION DEVICES

(75) Inventor: Alain Jousse, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 722 days.

(21) Appl. No.: 12/524,873

(22) PCT Filed: Jan. 24, 2008

(86) PCT No.: PCT/EP2008/050811
§ 371 (c)(1),
(2), (4) Date: Mar. 11, 2010

(87) PCT Pub. No.: WO2008/110398
PCT Pub. Date: Sep. 18, 2008

(65) Prior Publication Data
US 2010/0179729 A1  Jul. 15, 2010

(30) Foreign Application Priority Data
Mar. 15, 2007  (DE) .................. 10 2007 012 462

(51) Int. Cl.
*B60R 22/00* (2006.01)

(52) U.S. Cl.
USPC ............................. 701/45; 701/46; 701/300

(58) Field of Classification Search
USPC ..... 701/45; 340/436; 307/10.1, 9.1; 180/282; 280/735; 73/654
See application file for complete search history.

(56) References Cited

U.S. PATENT DOCUMENTS

| | | | | |
|---|---|---|---|---|
| 5,283,472 A * | 2/1994 | Takeuchi et al. | ............. | 307/10.1 |
| 5,343,394 A * | 8/1994 | Takeuchi et al. | ................ | 701/45 |
| 5,409,258 A * | 4/1995 | Kawabata | ..................... | 280/735 |
| 5,475,269 A * | 12/1995 | Takeuchi | ..................... | 307/10.1 |
| 5,544,915 A * | 8/1996 | Fendt et al. | ................... | 280/735 |
| 5,585,566 A * | 12/1996 | Welles et al. | ................... | 73/654 |
| 5,608,269 A * | 3/1997 | Fendt et al. | ................... | 307/9.1 |
| 5,657,831 A * | 8/1997 | Furui | ............................ | 180/282 |
| 5,737,224 A * | 4/1998 | Jeenicke et al. | ................ | 701/45 |
| 5,805,058 A * | 9/1998 | Saito et al. | ................... | 340/436 |
| 5,806,008 A * | 9/1998 | Takeuchi | ........................ | 701/45 |
| 5,825,098 A * | 10/1998 | Darby et al. | ................. | 307/10.1 |
| 5,835,873 A * | 11/1998 | Darby et al. | ..................... | 701/45 |
| 5,977,653 A * | 11/1999 | Schmid et al. | ............... | 307/10.1 |
| 6,819,992 B1 * | 11/2004 | Giordano | ........................ | 701/45 |
| 7,121,376 B2 | 10/2006 | Baumgartner et al. | | |
| 7,273,229 B2 * | 9/2007 | Miura | ........................... | 280/735 |
| 7,347,297 B2 * | 3/2008 | Ide et al. | ....................... | 180/282 |

(Continued)

FOREIGN PATENT DOCUMENTS

| | | |
|---|---|---|
| DE | 19526735 | 1/1996 |
| DE | 4447174 | 3/1996 |
| DE | 10057915 | 5/2002 |
| WO | WO 01/94158 | 12/2001 |
| WO | WO 2007/044997 | 4/2007 |

OTHER PUBLICATIONS

International Search Report, PCT International Patent Application No. PCT/EP2008/050811, dated Oct. 7, 2008.

*Primary Examiner* — Thomas Black
*Assistant Examiner* — Robert Payne
(74) *Attorney, Agent, or Firm* — Kenyon & Kenyon LLP

(57) ABSTRACT

A device for controlling passenger protection devices in which two hardware paths independent from one another are provided for activation. One interface IC is provided for each hardware path which has at least one circuit breaker and one power supply.

6 Claims, 1 Drawing Sheet

U.S. PATENT DOCUMENTS

| | | | |
|---|---|---|---|
| 7,930,080 B2 * | 4/2011 | Uono et al. | 701/45 |
| 2002/0167224 A1 | 11/2002 | Otterbach et al. | |
| 2004/0045760 A1 | 3/2004 | Baumgartner et al. | |
| 2010/0179729 A1 * | 7/2010 | Jousse | 701/45 |

* cited by examiner

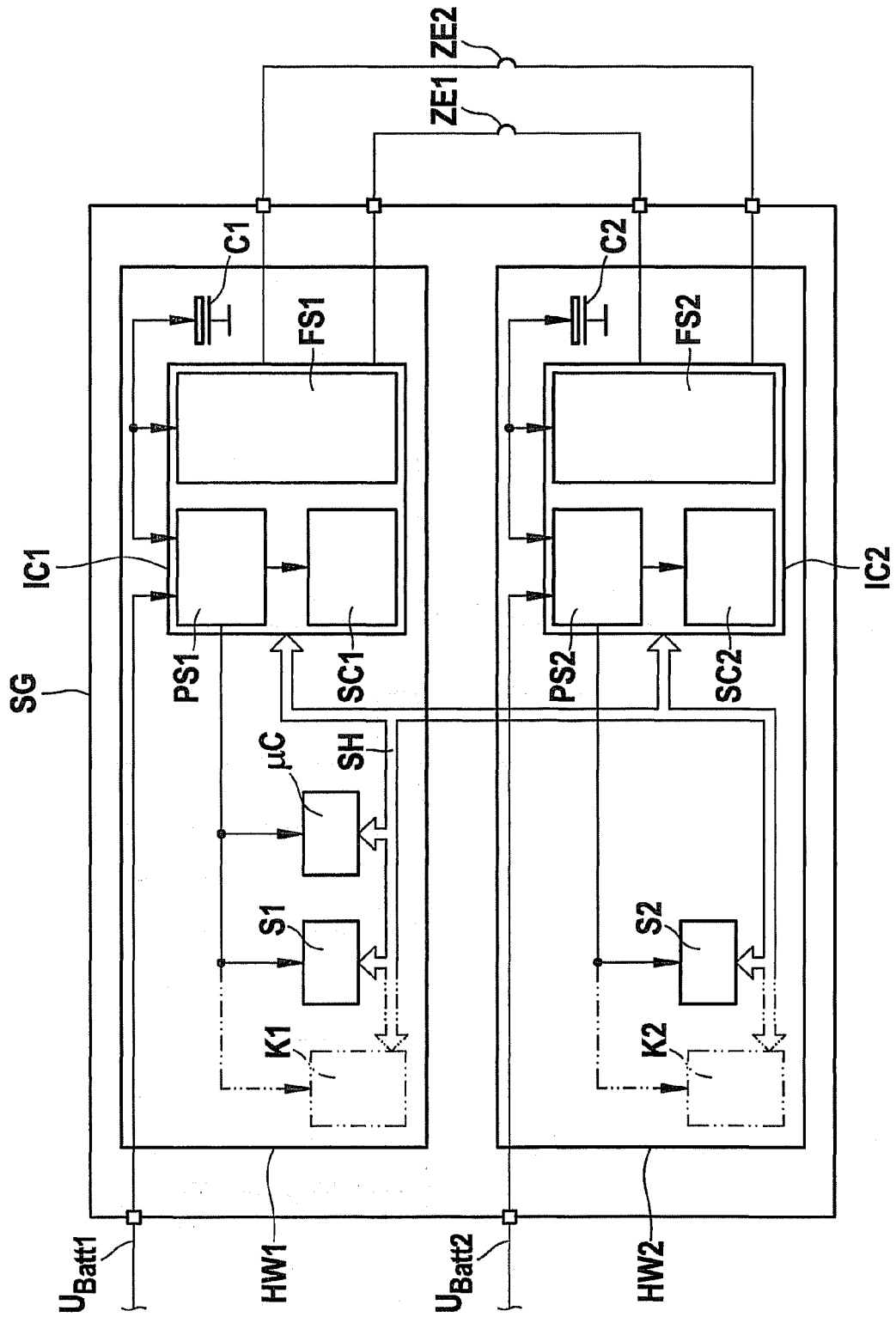

DEVICE FOR CONTROLLING PASSENGER PROTECTION DEVICES

FIELD OF THE INVENTION

The present invention relates to a device for controlling passenger protection devices.

BACKGROUND INFORMATION

Independent hardware paths regarding the analysis of sensor signals in a control unit for controlling passenger protection devices are described in German Patent Application No. DE 100 57 915 C2. On the one hand, the different hardware paths are formed by a processor and, on the other hand, by a safety IC (integrated circuit) which analyze the sensor signals in parallel in order to ascertain whether triggering of the passenger protection means is necessary.

SUMMARY

A device according to an example embodiment of the present invention for controlling passenger protection devices may have the advantage of increased redundancy, in that one output stage IC which has a circuit breaker and a power supply is provided for each hardware path. The power supply is used for supplying the components of the hardware path with power, whereby greater safety against faulty activation is achieved.

The power supply is connected to the vehicle electrical system, i.e., the car battery voltage, and converts this voltage into voltages necessary for the components of the hardware path. It is alternatively possible that the power supply is additionally or instead connected to one or multiple energy accumulator(s) such as capacitors and converts or provides the voltage for the power supply, which the energy accumulator(s) provide(s). A voltage restraint may also be provided here.

The output stage IC is an integrated circuit having several functions such as providing the circuit breakers and the power supply. The circuit breakers are frequently known as high-side and low-side breakers, the high-side breaker being connected between the ignition element and the energy reserve and the low-side breaker being connected between the ignition element and the chassis. The energy reserve is typically a capacitor whose energy is used for energizing and thus for igniting the ignition element. It is possible that further components are connected between the high-side breaker and the energy reserve. The same holds for the low-side breaker and the chassis. These circuit breakers are electrically controllable. If the circuit breakers are enabled, i.e., both, then current is fed to the ignition element or to the electromagnetic actuator. It is possible to provide more than one high-side breaker or low-side breaker.

A hardware path is meant to be a signal path into which a sensor signal is input and a triggering signal is output as a function of the sensor signal. The use of at least two hardware paths is necessary in passenger protection devices so that a malfunction of one hardware path does not result in unintentional triggering of the passenger protection devices.

It is particularly advantageous if an independent connection to the vehicle electrical system is provided for each hardware path. This means that all components of the respective hardware path having a dedicated connection to the vehicle electrical system are supplied with power via the power supply which is part of the output stage IC, meaning that the control unit has at least two connections to the vehicle electrical system. Likewise, an independent chassis connection to the respective hardware path is also advantageous.

An integrated circuit is thus used as the output stage IC, circuit breakers with power transistors being provided. In a first output stage IC, i.e., the first hardware path, these circuit breakers may be the high-side, i.e., the upper power output stage, and the output stage of the second IC of the second hardware path may be the low-side output stage. The redundancy of the output stages is manifested for the respective ignition element in that the corresponding high-side and low-side output stages are not in the same hardware path. At the same time, multiple power transistors may be provided for each output stage IC so that multiple ignition elements and other passenger protection devices may be controlled.

It is furthermore advantageous that at least one output stage IC has a safety semiconductor which analyzes at least one sensor signal in such a way that the at least one output stage, i.e., the circuit breaker, is enabled. This safety semiconductor is designed in such a way that it compares sensor values having fixed thresholds in order to ascertain whether an activation of the circuit breakers is necessary. This is carried out parallel to the microcontroller, thereby creating a subgroup of an independent hardware path with regard to the analysis of the sensor signal. The term sensor signal may mean the signal of only one accident sensor, e.g., an acceleration sensor, or also a plurality of signals of multiple accident sensors, or a combination of signals of accident sensors.

This safety semiconductor may be provided for each output stage IC or for only one.

In a preferred embodiment of the present invention, each hardware path has its own accident sensor system. This may typically be acceleration sensors. A structure-borne noise sensor system or a sensor system which detects angular motions may also be provided additionally or instead. It is also possible to connect sensors to the respective hardware path via interfaces which may be designed as hardware or software. However; it is alternatively also possible that only one accident sensor is present in the control unit and both hardware paths use this sensor signal.

Furthermore, it may be advantageous if an energy reserve is provided for each hardware path. The energy reserve is charged to a high voltage above the on-board voltage, mostly above 20 V, and is used for operating the control unit in particular in the case of autarchy, i.e., when the connection to the car battery is cut off. High redundancy is achieved by providing at least one energy reserve capacitor as the energy reserve for each hardware path; however, one single energy reserve capacitor may be provided for all hardware paths as an alternative. In the event of more than two hardware paths, it is also possible to provide one energy accumulator for a group of hardware paths.

Finally, it is also advantageous if the hardware paths are connected to each other only for data exchange. It is not taken into account that a connection also prevails via the ignition elements since the hardware paths end here in the sense of the present invention. This data exchange makes it possible that components which are present only once and which cannot communicate with one another via each hardware path are able to exchange information. To further improve the independence of the two hardware paths at this information interface, optocouplers, fuses, or also simple resistors, among other things, may be used.

BRIEF DESCRIPTION OF THE DRAWING

An exemplary embodiment of the present invention is shown in the FIGURE and explained in greater detail below.

FIG. 1 shows a block diagram of the device according to an example embodiment of the present invention.

DETAILED DESCRIPTION OF EXAMPLE EMBODIMENTS

FIG. 1 shows an embodiment variant of the device according to the present invention in a block diagram. Here a control unit SG has two connections to the vehicle electrical system $U_{Batt1}$ and $U_{Batt2}$ which are used to provide the car battery voltage for control unit SG. Only those components are presently shown which are necessary to understand the present invention. Connections $U_{Batt1}$ and $U_{Batt2}$ each lead to an output stage IC IC1 and IC2 and there to the section which is provided for the power supply, namely PS1 and PS2. Power supply PS1 and PS2 converts the voltage into such voltages which the control unit needs for the individual components. Power supply PS1 is connected to an energy reserve capacitor C1 and ensures that this energy supply capacitor C1 is charged to a voltage of, for example, over 20 V. The same is carried out by power supply PS2 with energy supply capacitor C2. In the case of triggering and in the case of autarchy or otherwise during operation, the power may then be drawn from this energy reserve C1 and C2. For this purpose, the capacitor is connected to the section for circuit breakers FS1 and again to power supply PS1 so that the power supply may draw the power necessary for operating control unit SG from the energy reserve capacitor.

The circuit breakers are situated in areas FS1 and FS2. The circuit breakers are power transistors, for example, which are able to carry the large ignition currents for ignition elements ZE1 and ZE2. A configuration made up of two power transistors is provided, i.e., one for each of the two ignition circuits. This means area FS1 has two high-side transistors and area FS2 has two low-side transistors. Diagnostic functions are also present in area FS1. In addition, an evaluating logic is provided which links the signals of the microcontroller, i.e., the triggering signal which is present via the SPI bus, for example, and the signal of safety semiconductor SC1 which indicates that it too has detected a triggering case. The circuit breakers are activated only when both signals indicate a triggering situation. In the simplest manner, an AND gate is present for this purpose. A third, a fourth, or additional breakers, which may be used for safety and which may be controlled using signals in different combinations, may be present in the ICs IC1 and IC2, and may be situated on a separate module or substrate.

It is possible that areas FS1 and FS2 each have no analyzing logic so that in this case only one control signal is applied to the circuit breakers.

Safety semiconductor SC1 or SC2 has fixedly programmed thresholds to test the sensor signal separately from microcontroller μC. In contrast, microcontroller μC has adaptive thresholds as a general rule. But fixed characteristic curves may also be used here as an alternative. Safety semiconductor SC1 or SC2 may also execute watchdog functions which microcontroller μC must answer correctly to demonstrate its function. Microcontroller μC and sensor S1 are supplied with voltage by power supply PS1 and also possible additional components K1, e.g., additional sensors, signal interfaces such as CAN or LIN drivers, external EEPROMs, etc.

Compared to upper hardware path HW1, only one sensor S2 and additional components K2 are present in lower hardware path HW2. These are also supplied by voltage supply PS2. Components K2 and sensor S2 are connected to IC IC2 via an SPI line and also to upper hardware path HW1. The only connection is thus the information transmission via the SPI bus used here. The connection via the ignition elements is not a connection of the hardware paths since they ultimately end at IC1 and IC2.

As a variant, it is possible that sensor S2 is omitted and safety semiconductor SC2 may also be omitted. This embodiment includes the separate power supply by the two ICs IC1 and IC2, only one battery connection also being possible. In this case there are only two ignition circuits, but it is possible that more ignition circuits may be controlled.

As explained above, additional external sensors may supply their data to control unit SG, which results in improved analysis.

What is claimed is:

1. A device for controlling a passenger protection device comprising:
    at least two hardware paths independent from one another for activation of the passenger protection device;
    one respective output stage IC provided for each hardware path, each respective output stage IC having at least respective circuit breaker and one respective power supply.

2. The device as recited in claim 1, wherein one independent connection to the vehicle electrical system is provided for each of the hardware paths.

3. The device as recited in claim 1, wherein each output stage IC has a respective safety semiconductor which analyzes at least one sensor signal in such a way that the respective circuit breaker of the output stage IC is activated as a function of this analysis.

4. The device as recited in claim 3, wherein one respective accident sensor is provided for each hardware path.

5. The device as recited in claim 1, wherein one power supply is provided for each hardware path.

6. The device as recited in claim 1, wherein the at least two hardware paths are connected to one another only for data exchange.

* * * * *

UNITED STATES PATENT AND TRADEMARK OFFICE
CERTIFICATE OF CORRECTION

PATENT NO.        : 8,463,501 B2
APPLICATION NO. : 12/524873
DATED             : June 11, 2013
INVENTOR(S)       : Alain Jousse Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 899 days.

Signed and Sealed this
Eighth Day of September, 2015

Michelle K. Lee
*Director of the United States Patent and Trademark Office*